(12) United States Patent
Frot et al.

(10) Patent No.: US 12,013,225 B2
(45) Date of Patent: Jun. 18, 2024

(54) METHOD OF MEASURING THE DEFORMATION OF A SUBSEA PIPELINE USING INTERFEROMETRY

(71) Applicant: IFP Energies nouvelles, Rueil-Malmaison (FR)

(72) Inventors: Didier Frot, Rueil-Malmaison (FR); Martin Gainville, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 296 days.

(21) Appl. No.: 17/639,957

(22) PCT Filed: Sep. 2, 2020

(86) PCT No.: PCT/EP2020/074407
§ 371 (c)(1),
(2) Date: Mar. 3, 2022

(87) PCT Pub. No.: WO2021/047969
PCT Pub. Date: Mar. 18, 2021

(65) Prior Publication Data
US 2022/0326006 A1    Oct. 13, 2022

(30) Foreign Application Priority Data
Sep. 13, 2019    (FR) ........................... 1910141

(51) Int. Cl.
*G01B 11/16*    (2006.01)
*G01L 1/24*    (2006.01)

(52) U.S. Cl.
CPC ............ *G01B 11/161* (2013.01); *G01L 1/248* (2013.01)

(58) Field of Classification Search
CPC ............................. G01B 11/161; G01L 1/248
See application file for complete search history.

(56) References Cited

U.S. PATENT DOCUMENTS 4,591,996 A    5/1986   Vachon
4,996,879 A *  3/1991   Kruka ................... G01M 3/243
                                                       73/592
5,963,042 A *  10/1999  Suyama ................. G01N 22/02
                                                       324/637

(Continued)

FOREIGN PATENT DOCUMENTS

DE    29924939 U1    12/2006
RU    2260742 C1     9/2005

OTHER PUBLICATIONS

Glenn A Lanan et al, "Fiber Optic Leak Detection Systems for Subsea Pipelines", Offshore Technology Conference, 2012 (Apr. 30, 2012), XP055465593, DOI: 10.4043/23070-MS ISBN: 978-1-61399-200-5, Distributed Strain Sensing (DSS); pp. 10-11.

(Continued)

*Primary Examiner* — Eric S. McCall
(74) *Attorney, Agent, or Firm* — Fitch, Even, Tabin & Flannery LLP

(57) ABSTRACT

The present invention is a method for measuring the deformation of a subsea pipeline (1), wherein an electromagnetic wave is emitted towards subsea pipeline (1), the electromagnetic wave being reflected by a metal layer (2) of subsea pipeline (1) and the reflected electromagnetic wave being analysed to deduce the deformation of subsea pipeline (1).

20 Claims, 3 Drawing Sheets

(56) References Cited

U.S. PATENT DOCUMENTS

| | | | | |
|---|---|---|---|---|
| 6,005,396 A | * | 12/1999 | Suyama | G01N 22/02 |
| | | | | 324/528 |
| 6,194,902 B1 | * | 2/2001 | Kuo | G01N 17/00 |
| | | | | 324/637 |
| 2010/0257949 A1 | | 10/2010 | Routeau | |
| 2016/0109410 A1 | * | 4/2016 | Sasaki | G01N 29/11 |
| | | | | 73/622 |
| 2017/0241895 A1 | * | 8/2017 | Melapudi | G01N 17/006 |
| 2019/0120046 A1 | * | 4/2019 | Guzman | E21B 17/028 |
| 2021/0381865 A1 | * | 12/2021 | Ellison | E21B 47/001 |
| 2022/0221429 A1 | * | 7/2022 | Popov | G01N 29/265 |

OTHER PUBLICATIONS

Berthold J W: "Detection of Flowline Blockage Using Bragg Grating Sensors", Proceedings of SPI E/ IS & T, vol. 3541, (Jan. 1, 1999), pp. 8-17, XP001106811, DOI: 10.1117/12.339076, ISBN: 978-1-62841-730-2, pp. 8-10.

International Search Report for PCT/EP2020/074407, dated Nov. 6, 2021; 5 pages.

* cited by examiner

[Fig 1]
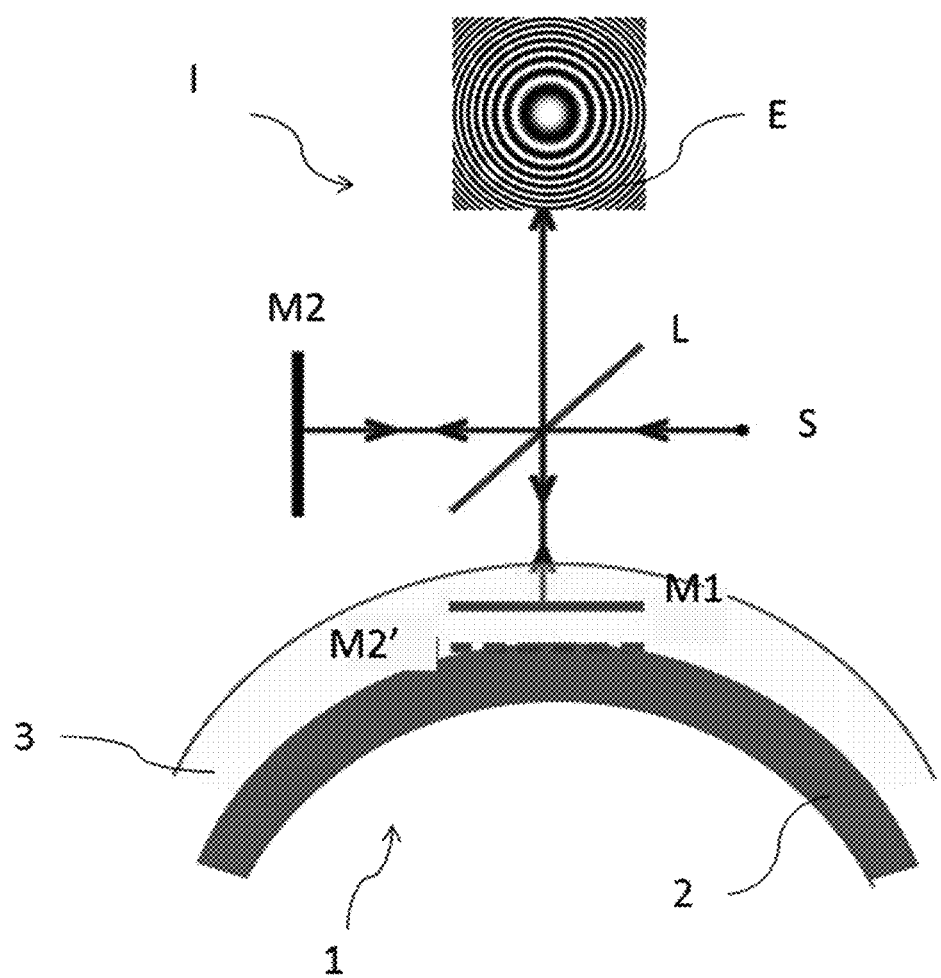

[Fig 2]
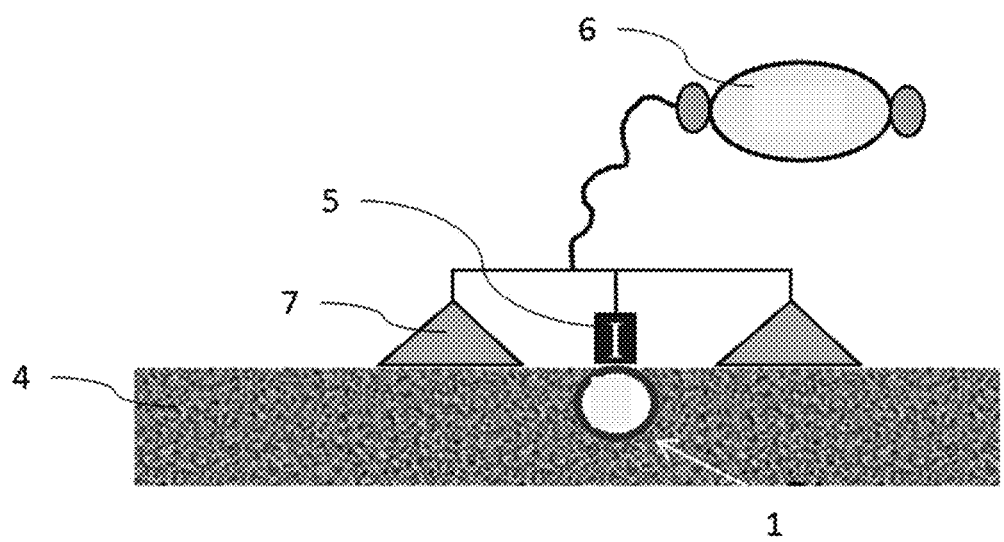

[Fig 3]
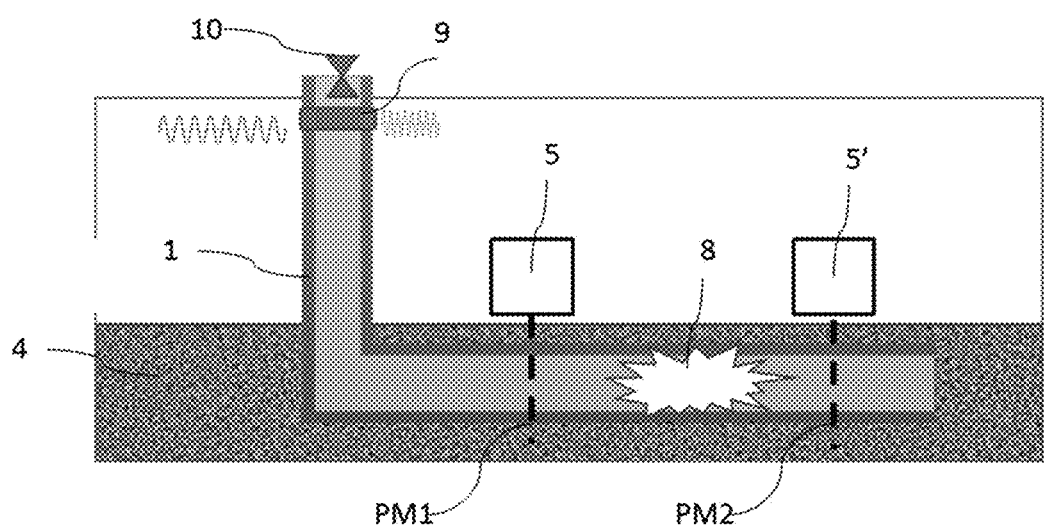

METHOD OF MEASURING THE DEFORMATION OF A SUBSEA PIPELINE USING INTERFEROMETRY

CROSS-REFERENCE TO RELATED APPLICATIONS

This application is a U.S. national phase application filed under 35 U.S.C. § 371 of International Application No. PCT/EP2020/074407, filed Sep. 2, 2020, designating the United States, which claims priority from French Patent Application No. 19 10 141, filed Sep. 13, 2019, which are hereby incorporated herein by reference in their entirety.

BACKGROUND OF THE INVENTION

Field of the Invention

The present invention relates to measuring the deformation of a subsea pipeline, in particular for locating at least one of a hydrate, paraffin plug formed in a subsea hydrocarbon, and a condensate gas production or gas injection pipe.

Description of the Prior Art

In the field of offshore oil production, at least one of hydrate and paraffin plugs may form in subsea oil production pipelines and the consequences of such plugs are prolonged production shutdown, which is costly and may lead to the abandonment of the production line or to the deterioration thereof when remediation operations involve significant mechanical stresses on the pipe caused by depressurization leading to fast plug run-away or local heating with overpressure due to confined hydrate dissociation.

In order to limit these problems and to intervene efficiently to unplug the lines, it is important to locate these plugs in the subsea pipelines.

Furthermore, for the field of offshore oil production and for other fields using subsea pipelines, it is also important to monitor the subsea pipelines, notably in terms of wear or fatigue, which may be due to mechanical stress. One possibility offered by this monitoring is determination of the deformation of subsea pipelines, as well as onshore buried pipes.

For these two applications (plug location and monitoring), various difficulties exist in characterizing the deformation of subsea pipelines. The main difficulty is the marine environment in which this detection or monitoring is to be performed because the means to be used are in an aqueous environment potentially at great depths. Another difficulty lies in the fact that subsea pipelines can be of different types which means operation must consider the pipe type, and notably even if the subsea pipeline is provided with an external coating of polymer material, or otherwise. Another problem is for applications when the subsea pipeline is totally or partly buried in the seabed sediments.

Interferometry is one of the techniques used for measuring the deformation of various objects, including pipelines. U.S. Pat. No. 4,591,996 and Chinese patent 108,007,375 describe methods based on the use of speckle interferometry. However, these methods are not suitable for use in a subsea environment, and they are complex to implement. In particular, the method described in Chinese patent 108,007,375 requires several sources and the object to be studied needs to be in a vacuum environment. Moreover, these methods cannot work if the object to be studied is provided with an external coating, or if it is partly or totally buried.

SUMMARY OF THE INVENTION

The present invention measures the deformation of a subsea pipeline, even if it comprises a coating, or if it is totally or partly buried, without requiring costly pipe excavation devices.

The present invention is a method of measuring the deformation of a subsea pipeline, wherein an electromagnetic wave is emitted towards the subsea pipeline. The electromagnetic wave is reflected by a metal layer of the subsea pipeline and the reflected electromagnetic wave is analysed to determine the deformation of the subsea pipeline. Such a method (in particular the emission of electromagnetic waves) can be implemented in a highly absorbent subsea environment, given that the signal used is the displacement of an interference pattern, and not based on the amplitude of bright fringes. Furthermore, the electromagnetic waves do not penetrate the subsea pipeline due to the metal layer that provides a reflection of high amplitude leading to high contrast interference pattern, which is therefore easily exploitable.

Additionally, the invention relates to a method of detecting plugs in a subsea pipeline by implementing the method of measuring the deformation of a subsea pipeline.

The invention relates to a method of measuring the deformation of a subsea pipeline, notably a hydrocarbon transport pipeline in which the deformation results from a variation in the mechanical stress undergone by the subsea pipeline, the subsea pipeline comprising at least one metal layer. The following steps are carried out for this method:
  a) emitting an electromagnetic wave towards the subsea pipeline;
  b) measuring the electromagnetic waves reflected by the metal layer of the subsea pipeline using an interferometer at least at two instants; and
  c) comparing the electromagnetic waves reflected by the metal layer of the subsea pipeline at the two instants to determine a deformation of the subsea pipeline.

According to one embodiment, the measurement method comprises a prior step of installing an optical system comprising an electromagnetic wave transmitter and an interferometer close to the subsea pipeline.

Advantageously, the optical system is stationary or mobile.

According to one aspect of the invention electromagnetic waves are emitted in the infrared range, preferably with a wavelength ranging between 0.6 and 1.5 µm.

According to one feature, the reflected electromagnetic waves are measured using a Michelson type interferometer.

According to one embodiment, the measurement method applies a pressure or thermal load to the subsea pipeline so as to generate the deformation of the pipeline.

Preferably, the subsea pipeline is subjected to a pressure load by a low-frequency acoustic emission or pressure fluctuation system at one end of the subsea pipeline.

In a variant, deformation of the pipeline is generated by dissociation of a plug formed in the subsea pipeline.

In addition, the invention relates to a method of determining the presence of a plug formed in the subsea pipeline, notably at least one of a hydrate and a paraffin plug formed in a hydrocarbon transport pipeline, wherein the following steps are carried out:
  a) subjecting the subsea pipeline to a pressure or thermal load;

b) measuring the deformation of the subsea pipeline at least at one measuring point by use of the method according to one of the above features, c) determining the presence of a plug between the pressure or thermal load point and the measuring point if the deformation of the pipeline at the at least one measuring point is not synchronous with the pressure or thermal load.

According to one implementation, the absence of a plug between the pressure or thermal load point and the measuring point is determined if the deformation of the pipeline at the at least one measuring point is synchronous with the pressure or thermal load.

According to one aspect, the position of a plug in the subsea pipeline is determined by carrying out several deformation measurements at several measuring points, the plug being located between two measuring points for which the deformations of the subsea pipeline are distinct.

BRIEF DESCRIPTION OF THE FIGURES

Other features and advantages of the method according to the invention will be clear from reading the description hereafter of embodiments given by way of non-limitative example, with reference to the accompanying figures wherein:

FIG. 1 illustrates the measurement by interferometry according to one embodiment of the invention;

FIG. 2 illustrates a measuring device capable of implementing the measurement method according to one embodiment of the invention; and FIG. 3 illustrates the implementation of the method of determining the presence of a plug according to one embodiment of the invention.

DETAILED DESCRIPTION OF THE INVENTION

The present invention relates to a method of measuring the deformation of a subsea pipeline. The deformation of a subsea pipeline may result from a variation in the mechanical stress applied to the subsea pipeline (imposed or intrinsic to the subsea pipeline). The deformation of the subsea pipeline may notably be the swelling, producing an increase in diameter, of the subsea pipeline. The subsea pipeline can contain at least one of a gas, a liquid, and a solid. Thus, the principle can correspond to monitoring the deformation of a pressure propagation along the pipeline in order to locate the blockage. Preferably, the subsea pipeline can be a transport pipe carrying hydrocarbons or condensate gas produced at sea. However, the invention concerns any type of subsea pipeline, for example electrical pipes, fluid transport pipes.

The subsea pipeline comprises at least one metal layer, for example made of steel. This metal layer notably provides (internal and/or external) pressure strength to the subsea pipeline. The subsea pipeline can comprise other layers, for example a polymer coating, an insulant, etc. The measurement method according to the invention is suitable for measuring the deformation of the metal layer of the subsea pipeline, even if it is coated with other, non-metallic layers (polymer for example). Furthermore, due to its mass and to the seabed sediment composition, the subsea pipeline can be partly or totally buried. The measurement method according to the invention is suitable for measuring the deformation of the subsea pipeline.

According to the invention, the deformation measurement method comprises the following steps:

emitting electromagnetic waves towards the subsea pipeline;

measuring the electromagnetic waves reflected by the metal layer of the subsea pipeline using an interferometer, at least at two instants; and comparing the measurements of the electromagnetic waves reflected at the two instants in order to determine the deformation of the subsea pipeline.

Indeed, the outer surface of the metal layer allows the emitted electromagnetic waves to be reflected towards an interferometer. In case of deformation of the subsea pipeline (and therefore displacement of the metal layer), the measured interference pattern is displaced. Thus, comparison between an interference measurement without subsea pipeline deformation (first measurement instant) and an interference measurement with deformation of the subsea pipeline (second measurement instant) is possible. Furthermore, this comparison makes it possible to easily determine the length of displacement (and therefore of deformation) of the subsea pipeline.

Moreover, given that the electromagnetic waves passing through the polymer and the sediments, the method according to the invention is suitable for all types of subsea pipelines and for buried subsea pipelines.

Such a method (in particular the emission of electromagnetic waves) can be implemented in a subsea environment, given that the signal which is exploited is the displacement of an interference pattern, and not the amplitude of the bright fringes (the amplitude of electromagnetic waves is attenuated by the marine environment and it can therefore not be directly exploited). In addition, the electromagnetic waves do not penetrate the subsea pipeline due to the metal layer thereof, which allows a light reflection of high amplitude leading to a much contrasted interference pattern, therefore readily exploitable.

According to one embodiment of the invention, emission of an electromagnetic wave towards the subsea pipeline can be performed in the infrared range. Indeed, this type of electromagnetic wave enables good measurements in the marine environment, including in the presence of sediments covering the subsea pipeline. Preferably, the wavelength of the electromagnetic wave can range between 0.6 and 1.5 μm.

According to one implementation of the invention, measurement of the electromagnetic waves can be performed using a Michelson type interferometer, which affords the advantage of being simple, accurate and widespread.

According to an embodiment option, the deformation of the subsea pipeline can be determined by analysis of the interference pattern displacement.

According to one embodiment of the invention, the measurement method can comprise a prior step of installing an optical system close to the subsea pipeline. The optical system can be permanently installed, in which case it is referred to as "stationary". It can then be a box. This first case favors repeatability of the measurements. Alternatively, the optical system can be installed temporarily at the time of a deformation measurement in this case, it is referred to as "mobile". Although mobile, the optical system remains still while measuring. The system moves between measurements. In order to ensure stillness of the system during measurement, supports capable of resting on the seabed without sinking during measurement and having a large contact surface can be provided. This second alternative favors measurement of the subsea pipeline deformation at several points of the pipe. In this configuration, the optical system can be moved by an underwater vessel.

The optical system comprises an electromagnetic wave transmitter and an interferometer. In addition, the optical system can comprise compae the reflected electromagnetic waves measurement.

Preferably, the optical system can be arranged close to (i.e. a few centimeters) the subsea pipeline. Attenuation of the electromagnetic waves as they propagate through the seawater is thus significantly decreased, which provides precise measurements. Furthermore, the measurements are thus not affected by the effects of the sea current.

The method according to the invention allows determination of deformation of a subsea pipeline, regardless of the cause of this deformation.

According to a first embodiment, the deformation of the subsea pipeline may be caused by a pressure or thermal load. This load generates a mechanical stress in the subsea pipeline. For this embodiment, the subsea pipeline can be subjected to a pressure load for example by a low-frequency acoustic emission or pressure fluctuation system. Preferably, this acoustic emission system can be arranged close to one end of the subsea pipeline. For example, to initiate displacement of the subsea pipeline, a signal with an amplitude of a few bars (for example 10 bars, i.e. 1 MPa). Indeed, such a signal generates a deformation of the subsea pipeline of the order of 10 to 100 μm, which can be easily measured by interferometry in at least one of the visible and near-infrared range.

According to a second embodiment, the deformation of the subsea pipeline can be caused by a physical phenomenon in the core of the subsea pipeline. For example, the deformation of the subsea pipeline can be related to the dissociation of a plug (for example at least one of a hydrate and a paraffin plug in the case of a hydrocarbon transport pipe), which generates pressure variations in the pipeline which deform the subsea pipeline.

FIG. 1 schematically illustrates, by way of non-limitative example, a Michelson interferometer used with in the measurement method according to one embodiment of the invention. To measure the deformation of a subsea pipeline 1, an interferometer I is arranged close to subsea pipeline 1. Subsea pipeline 1 comprises a metal layer 2 and an outer layer 3, for example a polymer layer. As is well known, interferometer I comprises an electromagnetic wave source S, a splitter blade L, a mirror M2 and a measuring surface E on which the interference pattern forms. The electromagnetic waves emitted by source S passes through splitter blade L, either in the direction of mirror M2 or in the direction of subsea pipeline 1. The electromagnetic waves are reflected by the outer surface of metal layer 2 of subsea pipeline 1 thus forming a reflection surface M2'. This reflection surface M2' is the outer surface of metal layer 2. The wave reflected by mirror M2 and by reflection surface M2' is then directed towards measuring surface E to form the interference pattern. When subsea pipeline 1 is deformed, the outside diameter of metal layer 2 increases. The reflection surface then moves, the reflection surface after deformation is denoted by M1. As a result, the distance travelled by the electromagnetic waves differs, which causes a variation in the interference pattern on measuring surface E. The distance between points M1 and M2' can be of the order of 15 μm.

FIG. 2 schematically illustrates, by way of non-limitative example, the installation of an interferometer 5 close to a subsea pipeline 1 for the method according to one embodiment of the invention. Subsea pipeline 1 is buried in sediments 4. For this embodiment, the optical system (interferometer 5) is connected (by an optical fiber for example) to an underwater vessel 6. Optical system 5 comprises stabilization supports 7 provided to ensure immobilization of optical system 5 without sinking thereof while measuring.

Furthermore, the present invention relates to a method of determining the presence of a plug in a subsea pipeline. What is referred to as a plug is any pseudo-solid element partly or totally obstructing a section of the subsea pipeline. In the rest of the description hereafter, a plug is considered to completely seal a section of the pipe. In the field of hydrocarbon transport pipelines, a plug can for example be at least one of hydrates and paraffins. Such plugs may form when hydrocarbon production is stopped due to the pressure and temperature conditions in the marine environment.

For this method of determining the presence of a plug, the following steps are carried out:
  subjecting the subsea pipeline to a pressure or thermal load at one point of the subsea pipeline, referred to as load point, for example by means of a system capable of modifying the internal pressure of the pipeline, cyclically or not, arranged at one end of the subsea pipeline;
  measuring the deformation of the subsea pipeline at least at one measuring point by use of the method according to any one of the variants or variant combinations described above. In other words, an interferometer is positioned at least at one measuring point and comparison is performed of the electromagnetic waves reflected by the metal layer of the subsea pipeline, with and without pressure or thermal load, and deducing therefrom a possible deformation of the subsea pipeline; and
  determining the presence of a plug between the load point and the measuring point if the deformation of the pipeline at the measuring point is zero or low, and a fortiori asynchronous with the generated load.

Indeed, the presence of a plug in the subsea pipeline modifies the behavior of the subsea pipeline downstream from the plug.

This method also allows determining the absence of a plug between the load point and the measuring point if the pipe deformation at the measuring point is not zero and synchronous with the generated load.

According to one embodiment of the invention, the position of a plug in a subsea pipeline can be determined by carrying out several deformation measurements at several measuring points. In this case, the plug is positioned in the subsea pipeline between two adjacent measuring points for which the subsea pipeline deformations are distinct. In other words, the plug is positioned between the last measuring point (starting from the load point) for which the deformation is synchronous with the generated load and the first measuring point (starting from the load point) for which the deformation is zero or low, and asynchronous with the generated load.

In order to improve the determination of the plug position, these measurements can be repeated at measuring points located between the last measuring point (starting from the load point) for which the deformation is synchronous with the generated load and the first measuring point (starting from the load point) for which the deformation is zero or low, and asynchronous with the generated load.

Thus, according to one implementation of the invention, the method of determining the position of a plug in a subsea pipeline can comprise the following steps:
  1) in the absence of mechanical stress (no load applied to the subsea pipeline), measuring occurred with an interferometer positioned at the relative distance, denoted by M'2 (according to FIG. 1 for example), between the interferometer and the upper end of the metal layer of the subsea pipeline, which records as a stable reference,
2) then, in the presence of a mechanical stress, is applied at a known frequency, applying a pressure load to the subsea pipeline likely to contain a fluid mixture of an (incompressible) liquid or solid and of a (compressible) gas, plugged at an unknown point in space whose location is to be determined,
3) while applying this mechanical stress to the subsea pipeline in step 2), measuring by means of the interferometer the relative distance, denoted by M1 (according to FIG. 1 for example), between the interferometer and the upper end of the metal layer of the subsea pipeline, and recording a synchronous or non-synchronous displacement respectively reflecting the swelling or the non-swelling of the subsea pipeline subjected to a pressure load.
   a. if the displacement is synchronous with the overpressure (imposed load) meaning that the subsea pipeline expands, this means that the measuring point is downstream from the pipe in relation to the plug that is in the part communicating with the pressure load point,
   b. if the displacement cannot be determined or is low and non-synchronous with the overpressure applied (imposed load), this means that the measuring point is upstream from the pipe in relation to the plug and at the load point.

FIG. 3 schematically illustrates, by way of non-limitative example, the implementation of the method of determining the presence of a plug according to one embodiment of the invention. For the example illustrated, the subsea pipeline comprises a first end provided with a valve 10, a vertical part descending to the seabed and a horizontal part buried in sediments 4. For this example, a plug 8 is assumed to have formed in the horizontal part of subsea pipeline 1. An acoustic emission system 9 and two optical systems 5 and 5' are used to determine the presence of a plug. Acoustic emission system 9 generates a high-frequency acoustic wave (the emitted acoustic waves are schematically represented by sinusoids) at the end of the subsea pipe, close to valve 10. Optical systems 5 and 5' comprise an electromagnetic wave transmitter and an interferometer (according to the embodiment of FIG. 1 for example). They are arranged close to subsea pipeline 1, at measuring points PM1 and PM2 respectively. These optical systems 5 and 5' can be "stationary" or "mobile". According to one embodiment option, optical system 5' can be optical system 5 that has been moved to measuring point PM2 after measurement at measuring point PM1.

For the method according to the invention, a first deformation measurement of subsea pipeline 1 is carried out at points PM1 and PM2, at a first instant, with no load applied by acoustic emission system 9. These measurements are repeated at measuring points PM1 and PM2 at a second instant after starting acoustic emission system 9. For each measuring point, the measurements performed at the first instant are compared with those performed at the second instant, and it is checked whether the measurements are synchronous or not with the load applied by acoustic emission system 9. In the case illustrated, interferometer 5 at measuring point PM1 is located between the load point of acoustic emission system 9 and plug 8, then the resulting measurements are synchronous with the load applied by acoustic emission system 9. Furthermore, interferometer 5' at measuring point PM2 is located after plug 8, then the resulting measurements are not synchronous with the load applied by acoustic emission system 9. Thus, with these results, it can be deduced that the plug is located between measuring points PM1 and PM2.

Furthermore, the present invention relates to a method of monitoring a subsea pipeline implementing the method of measuring the deformation of a subsea pipeline according to any one of the variants or variant combinations described in the present application. The monitoring method can comprise a step of determining the wear or the fatigue of the subsea pipeline from the measurement of the subsea pipeline deformation.

The invention is not limited only to the embodiments described above by way of example and, encompasses all variant embodiments.

The invention claimed is:

1. A method of measuring deformation of a subsea pipeline resulting from variation in underwater mechanical stress undergone by the subsea pipeline including at least one metallic layer comprising the steps of:
   a) emitting an electromagnetic wave towards the subsea pipeline;
   b) measuring at least at two spaced apart locations along the pipeline electromagnetic waves with an interferometer reflected by the at least one metallic layer of the pipeline; and
   c) comparing the electromagnetic waves reflected by the at least one metallic layer of the subsea pipeline at the two spaced apart locations along the pipeline to determine the deformation of the subsea pipeline.

2. A measurement method as claimed in claim 1, wherein the reflected electromagnetic waves are measured by using a Michelson type interferometer.

3. A measurement method as claimed in claim 1, wherein a deformation of the pipeline is generated by dissociation of a plug formed in the subsea pipeline.

4. A measurement method as claimed in claim 1, wherein electromagnetic waves are emitted in an infrared range with a wavelength ranging between 0.6 and 1.5 µm.

5. A measurement method as claimed in claim 4, wherein electromagnetic waves are emitted in an infrared range, with a wavelength ranging between 0.6 and 1.5 µm.

6. A measurement method as claimed in claim 4, wherein the reflected electromagnetic waves are measured using a Michelson type interferometer.

7. A measurement method as claimed in claim 6, wherein the subsea pipeline is subjected to a pressure load by acoustic emission or pressure from a pressure fluctuation system at one end of the subsea pipeline.

8. A method of determining a presence of a plug formed in a subsea pipeline, comprising at least one of a hydrate and a paraffin plug formed in the pipeline, comprising steps of:
   a) subjecting the subsea pipeline to a pressure or thermal load at a load point of the subsea pipeline by a system which cyclically modifies internal pressure of the pipeline;
   b) measuring the deformation of the subsea pipeline at least at one measuring point by use of the method of claim 1; and
   c) determining presence of a plug located between the pressure or thermal load point and the measuring point while deformation of the subsea pipeline at the at least one measuring point is not synchronous with the pressure or thermal load.

9. A method of determining the presence of a plug as claimed in claim 8, wherein a position of a plug in the subsea pipeline is determined by deformation measurements made at measuring points with the plug being located between two measuring points at which the deformations of the subsea pipeline are detectable.

10. A method of determining a plug as claimed in claim 8, wherein an absence of a plug located between a point of pressure application or thermal load application and the measuring point is determined if the deformation of the pipeline at the at least one measuring point is synchronous with the pressure or thermal load.

11. A method of determining the presence of a plug as claimed in claim 10, wherein a position of a plug in the subsea pipeline is determined by deformation measurements made at measuring points with the plug being located between two measuring points at which the deformations of the subsea pipeline are detectable.

12. A measurement method as claimed in claim 1, wherein the measurement method comprises:
   prior to emitting the electromagnetic waves, installing an optical system comprising an electromagnetic wave transmitter and an interferometer adjacent to the subsea pipeline.

13. A measurement method as claimed in claim 12, wherein the reflected electromagnetic waves are measured by using a Michelson type interferometer.

14. A measurement method as claimed in claim 12, wherein the measurement method comprises applying a pressure or thermal load to the subsea pipeline which generates the deformation of the subsea pipeline.

15. A measurement method as claimed in claim 12, wherein the optical system is one of stationary or mobile.

16. A measurement method as claimed in claim 15, wherein electromagnetic waves are emitted in an infrared range, with a wavelength ranging between 0.6 and 1.5 µm.

17. A measurement method as claimed in claim 16, wherein the reflected electromagnetic waves are measured using a Michelson type interferometer.

18. A measurement method as claimed in claim 12, wherein electromagnetic waves are emitted in an infrared range, with a wavelength ranging between 0.6 and 1.5 µm.

19. A measurement method as claimed in claim 18, wherein electromagnetic waves are emitted in an infrared range, with a wavelength ranging between 0.6 and 1.5 µm.

20. A measurement method as claimed in claim 18, wherein the reflected electromagnetic waves are measured using a Michelson type interferometer.

* * * * *